(12) United States Patent
Barton (10) Patent No.: US 9,029,040 B2
(45) Date of Patent: May 12, 2015

(54) FUEL CELL STACK AND COMPRESSION SYSTEM THEREFOR

(75) Inventor: Russell H. Barton, New Westminster (CA)

(73) Assignee: Intelligent Energy Limited, Loughborough (GB)

( * ) Notice: Subject to any disclaimer, the term of this patent is extended or adjusted under 35 U.S.C. 154(b) by 369 days.

(21) Appl. No.: 13/448,432

(22) Filed: Apr. 17, 2012

(65) Prior Publication Data

US 2013/0273452 A1 Oct. 17, 2013

(51) Int. Cl.
 *H01M 8/24* (2006.01)
 *B01J 7/00* (2006.01)
 *C01B 3/06* (2006.01)

(52) U.S. Cl.
 CPC .. *B01J 7/00* (2013.01); *Y02E 60/50* (2013.01); *H01M 8/2465* (2013.01); *H01M 8/248* (2013.01); *Y02B 90/18* (2013.01); *Y02E 60/362* (2013.01); *C01B 3/065* (2013.01); *B01J 2219/1921* (2013.01); *B01J 2219/1923* (2013.01); *B01J 2219/1928* (2013.01); *H01M 2250/30* (2013.01)

(58) Field of Classification Search
 CPC ..... H01M 8/24; H01M 8/248; H01M 8/2465; F16B 2/04; F16B 5/0008; F16B 5/0036; F16B 5/065; B60P 7/0807; B60P 8/0823; B60P 7/0884; B60P 7/46; B60P 7/16
 USPC .................... 429/469; 267/70, 80, 91, 97, 99, 267/110–112, 147, 214
 See application file for complete search history.

(56) References Cited

U.S. PATENT DOCUMENTS

| | | | |
|---|---|---|---|
| 2,140,164 A * | 12/1938 | Moffatt | 24/199 |
| 3,814,410 A * | 6/1974 | Fukui et al. | 267/47 |
| 4,430,390 A | 2/1984 | Fekete | |
| 4,692,391 A | 9/1987 | Hirota | |
| 4,973,531 A | 11/1990 | Zaima et al. | |
| 5,686,200 A * | 11/1997 | Barton et al. | 429/511 |
| 5,789,091 A | 8/1998 | Wozniczka et al. | |
| 5,993,987 A | 11/1999 | Wozniczka et al. | |
| 6,040,072 A | 3/2000 | Murphy et al. | |
| 6,372,372 B1 * | 4/2002 | D'Aleo et al. | 429/434 |
| 6,413,665 B1 | 7/2002 | Blanchet et al. | |
| 6,461,756 B1 | 10/2002 | Blanchet et al. | |
| 6,797,425 B2 | 9/2004 | Blanchet | |
| 7,037,618 B2 | 5/2006 | Andrews et al. | |
| 7,833,678 B2 * | 11/2010 | Inagaki | 429/511 |
| 7,993,788 B2 | 8/2011 | Tsai et al. | |
| 8,012,648 B2 | 9/2011 | Bogumil et al. | |
| 2006/0093890 A1 | 5/2006 | Steinbroner | |

(Continued)

FOREIGN PATENT DOCUMENTS

JP 2001126750 11/2001

*Primary Examiner* — Milton I Cano
*Assistant Examiner* — Michael Dignan
(74) *Attorney, Agent, or Firm* — Baker & Hostetler LLP (57) ABSTRACT

A fuel cell stack and a compression system for providing compressive force to a fuel cell stack having first and second ends is provided. The compression system includes asymmetric leaf springs operatively connected to first and second ends of the fuel cell stack. Each leaf spring includes a slot having first and second connector positions. The compression system also includes tension members connected to the leaf springs. The tension members compress the leaf springs to provide a compressive load to the fuel cell stack.

16 Claims, 7 Drawing Sheets

(56) References Cited

U.S. PATENT DOCUMENTS

| | | |
|---|---|---|
| 2007/0248855 A1 | 10/2007 | Reinert |
| 2008/0044713 A1 | 2/2008 | Fritz et al. |
| 2008/0044714 A1 | 2/2008 | Fritz et al. |
| 2008/0070068 A1 | 3/2008 | Fritz et al. |
| 2011/0086292 A1 | 4/2011 | Ko et al. |
| 2011/0123894 A1 | 5/2011 | Erikstrup |

* cited by examiner

FIG. 13

FUEL CELL STACK AND COMPRESSION SYSTEM THEREFOR

FIELD OF THE INVENTION

The present invention generally relates to fuel cells, and more particularly relates to a system for providing a compressive load on a stack of fuel cells.

BACKGROUND OF THE INVENTION

Interest in fuel cell batteries as power sources for portable electronic devices has grown. A fuel cell is an electrochemical cell that uses materials from outside the cell as the active materials for the positive and negative electrodes. Because a fuel cell does not have to contain all of the active materials used to generate electricity, the fuel cell can be made with a small volume relative to the amount of electrical energy produced compared to other types of batteries.

Fuel cells can be categorized according to the types of materials used in the positive electrode (cathode) and negative electrode (anode) reactions. One category of fuel cell is a hydrogen fuel cell using hydrogen as the negative electrode active material and oxygen as the positive electrode active material. When such a fuel cell is discharged, hydrogen is oxidized at the negative electrode to produce hydrogen ions and electrons. The hydrogen ions pass through an electrically nonconductive, ion permeable separator and the electrons pass through an external circuit to the positive electrode, where oxygen is reduced.

A fuel cell system can include a fuel cell battery, including one or more fuel cells and a hydrogen source. In order to produce a sufficient amount of power, a plurality of individual cells may be stacked in series to form a fuel cell stack. Generally, intimate contact must be maintained throughout the stack of individual fuel cells as the fuel cells hydrate and dehydrate to expand and contract during usage. Compression systems are typically employed to apply a compressive load to the stack which typically includes springs between the end plates which are connected with tension members via bolts or threaded rods.

It is desirable to provide for a compression system for a fuel cell stack that has one or more of the following features: provides uniform compression of the fuel cell stack, is simple and easy to manufacture and assemble, and has long-term durability and easy and economic manufacturing.

SUMMARY OF THE INVENTION

According to one aspect of the present invention, a compression system for providing compressive force to a fuel cell stack having first and second ends is provided. The compression system includes a first asymmetric leaf spring operatively connected to the first end of the fuel cell stack. The compression system includes a second asymmetric leaf spring operatively connected to the first end of the fuel cell stack. The compression system also includes at least one tension member operatively connected to the first leaf spring and supported at the second end of the fuel cell stack. The compression system further includes at least another tension member operatively connected to the second leaf spring and supported at the second end of the fuel cell stack. The at least one and the at least another of the tension members compress the first and second leaf springs to provide a compressive load to the fuel cell stack. Embodiments can include one or more of the following features:

the first leaf spring further includes first and second connector positions and the second leaf spring includes first and second connector positions;

the at least one tension member is connected at the first and second connector positions of the first leaf spring and the at least another tension member is connected at the first and second connector positions of the second leaf spring;

a first asymmetric leaf spring includes a first slot having the first and second connector positions and the second asymmetric leaf spring includes a second slot having the first and second connector positions;

the at least one tension member includes a first tension member connected at the first connector position of the first leaf spring and a second tension member connected at the second connector position of the first leaf spring;

the at least another tension member includes a third tension member connected at the first connector position of the second leaf spring and a fourth tension member connected at the second connector position of the second leaf spring;

the compression system further includes a third asymmetric leaf spring operatively connected to the second end of the fuel cell stack and having a third slot including first and second connector positions, and a fourth asymmetric leaf spring operatively connected to the second end of the fuel cell stack and including a fourth slot having first and second connector positions, wherein the first and second tension members connect the first leaf spring to the third leaf spring, and wherein the third and fourth tension members connect the second leaf spring to the fourth leaf spring;

each of the first and second asymmetric leaf springs has a first length between the second connector position and a first end of the leaf spring and a second length between the second connector position and an opposite second end of the leaf spring, wherein the first length is greater than the second length;

each of the first and second slots includes a vertical opening and first and second horizontal openings, wherein each of the first and second tension members has a spring bias and a leg is inserted into the vertical opening so that the leg that is biased to move into one of the first and second connector positions to form a friction connection;

each of the at least one and the at least another tension members includes a bent wire;

each of the first and second leaf springs includes first and second shoulders that extend beyond a width of the fuel cell stack such that the at least one and at least another tension members extend along a height of the fuel cell stack and are spaced therefrom; and the first and second leaf springs are in contact with a non-conductive end plate.

According to another aspect of the present invention, a fuel cell system is provided. The fuel cell system includes a fuel cell stack having first and second ends and a compression system for providing compressive load to the fuel cell stack. The compression system includes a first asymmetric leaf spring operatively connected to the first end of the fuel cell stack. The compression system includes a second asymmetric leaf spring operatively connected to the first end of the fuel cell stack. The compression system also includes at least one tension member operatively connected to the first leaf spring and supported at the second end of the fuel cell stack. The compression system further includes at least another tension member operatively connected to the second leaf spring and supported at the second end of the fuel cell stack. The at least one and the at least another of the tension members compress the first leaf spring to provide a compressive load to the fuel cell stack. Embodiments can include one or more of the following features:

the first leaf spring further includes first and second connector positions and the second leaf spring includes first and second connector positions;

the at least one tension member is connected at the first and second connector positions of the first leaf spring and the at least another tension member is connected at the first and second connector positions of the second leaf spring;

a first asymmetric leaf spring includes a first slot having the first and second connector positions and the second asymmetric leaf spring includes a second slot having the first and second connector positions;

the at least one tension member includes a first tension member connected at the first connector position of the first leaf spring and a second tension member connected at the second connector position of the first leaf spring;

the at least another tension member includes a third tension member connected at the first connector position of the second leaf spring and a fourth tension member connected at the second connector position of the second leaf spring;

the compression system further includes a third asymmetric leaf spring operatively connected to the second end of the fuel cell stack and having a third slot including first and second connector positions, and a fourth asymmetric leaf spring operatively connected to the second end of the fuel cell stack and including a fourth slot having first and second connector positions, wherein the first and second tension members connect the first leaf spring to the third leaf spring, and wherein the third and fourth tension members connect the second leaf spring to the fourth leaf spring;

each of the first and second asymmetric leaf springs has a first length between the second connector position and a first end of the leaf spring and a second length between the second connector position and an opposite second end of the leaf spring, wherein the first length is greater than the second length;

each of the first and second slots includes a vertical opening and first and second horizontal openings, wherein each of the first and second tension members has a spring bias and a leg is inserted into the vertical opening so that the leg that is biased to move into one of the first and second connector positions to form a friction connection; and the fuel cell system further includes first and second non-conductive end plates forming the first and second ends, wherein the compression system contacts the first and second non-conductive end plates.

According to a further aspect of the present invention, a compression system for providing compressive force to a fuel cell stack having first and second ends is provided. The compression system includes a first leaf spring operatively connected to the first end of the fuel cell stack. The first leaf spring includes a first slot having first and second connector positions. The compression system also includes a first tension member connected at the first connector position of the first leaf spring and supported at the second end of the fuel cell stack. The compression system further includes a second tension member connected at the second connector position of the first leaf spring and supported at the second end of the fuel cell stack. The first and second tension members compress the first leaf spring to provide a compressive load to the fuel cell stack. In an embodiment, the compression system can further include a second leaf spring operatively connected to the second end of the fuel cell stack, the second leaf spring including a slot having first and second connector positions, wherein the first tension member is connected at the first connector position of the second leaf spring and the second tension member is connected at the second connector position of the second spring, wherein the first and second tension members compress the first and second leaf springs to provide a compressive load to the fuel cell stack.

These and other advantages of the invention will be further understood and appreciated by those skilled in the art by reference to the following written specification, claims, and appended drawings.

DETAILED DESCRIPTION OF THE PREFERRED EMBODIMENTS

A compression system for providing compressive force for a fuel cell stack having first and second ends and a fuel cell system that employs the compression system are disclosed. The fuel cell stack includes a plurality of fuel cells generally stacked in series one on top of another to form the stack. The number of individual fuel cells employed in the stack may be any number sufficient to produce a desired amount of electrical power as needed for the intended application. Fuel cells typically include a positive electrode (cathode) and a negative electrode (anode). According to one embodiment, the fuel cell is a hydrogen fuel cell using hydrogen as the negative electrode active material and oxygen as the positive electrode active material. When the fuel cell is discharged, oxygen is oxidized at the negative electrode to produce hydrogen ions and electrons. The hydrogen ions pass through an electrically non-conductive, ion permeable separator and the electrons pass through an external circuit to the positive electrode, where oxygen is reduced. It should be appreciated that other types of fuel cell stacks desirable of employing a compression system may be employed. A fuel cell system can include one or more fuel cell stacks. The fuel cell system can also include other components, such as control systems, hydrogen sources, fans, filters and the like.

The fuel cell system employs a compression system that compresses the stack of individual fuel cells so as to maintain intimate contact throughout the stack of cells as the fuel cells hydrate and dehydrate to expand and contract during usage. The compression system essentially compresses end plates at opposite ends of the stack toward each other so as to provide a substantially uniform compression during the use of the fuel cell stack. The compression force applied to the fuel cell stack may be around forty to one hundred pounds. The compression system is simple and easy to manufacture and assemble and has long-term durability and economical manufacturing.

The compression system provides compressive force to a fuel cell stack having first and second ends. The compression system includes a first asymmetric leaf spring operatively connected to the first end of the fuel cell stack. The compression system includes a second asymmetric leaf spring operatively connected to the first end of the fuel cell stack. The compression system also includes at least one tension member operatively connected to the first leaf spring and supported at the second end of the fuel cell stack. The compression system further includes at least another tension member operatively connected to the second leaf spring and supported at the second end of the fuel cell stack. The at least one and the at least another of the tension members compress the first and second leaf springs to provide a compressive load to the fuel cell stack.

The compression system can be further configured such that the first leaf spring includes first and second connector positions and the second leaf spring includes first and second connector positions. The at least one tension member is connected at the first and second connector positions of the first leaf spring. The at least another tension member is connected at the first and second connector positions of the second leaf spring.

The tension members could be connected to the leaf springs in any suitable manner, such as with fasteners or by welding, but in a preferred embodiment the compression system is configured such that the first asymmetric leaf spring includes a first slot having the first and second connector positions and the second asymmetric leaf spring includes a second slot having the first and second connector positions. The at least one tension member can include a single tension member with a first end connected at the first connector position of the first leaf spring and a second end connected at the second connector position of the first leaf spring. Alternatively, the at least one tension member can include two tension members—a first tension member connected at the first connector position of the first leaf spring and a second tension member connected at the second connector position of the first leaf spring. Similarly, the at least another tension member can include a single tension member with a first end connected at the first connector position of the second leaf spring and a second end connected at the second connector position of the second leaf spring, or the at least another tension member can include a third tension member connected at the first connector position of the second leaf spring and a fourth tension member connected at the second connector position of the second leaf spring.

The tension members operatively connected to either or both of the first and second leaf springs at the first end of the fuel cell stack can be supported at the second end of the fuel stack by extending from the first or second leaf spring, around the second end of the fuel cell stack, and back to the first or second leaf spring, or the tension members can be operatively connected to leaf springs on the second end of the fuel cell stack. For example, a single tension member that is operatively connected at both ends to the first leaf spring can be operatively connected to the third leaf spring by crossing the third leaf spring, thereby compressing the third leaf spring. Similarly, a single tension member that is operatively connected at both ends to the second leaf spring can be operatively connected to the fourth leaf spring by crossing the fourth leaf spring, thereby compressing the fourth leaf spring. Alternatively, the compression system can include a third asymmetric leaf spring operatively connected to the second end of the fuel cell stack. The third leaf spring can have a third slot including first and second connector positions. The compression system can also include a fourth asymmetric leaf spring operatively connected to the second end of the fuel cell stack, and the fourth leaf spring can have a fourth slot having first and second connector positions. The first and second tension members can connect the first leaf spring to the third leaf spring, and the third and fourth tension members can connect the second leaf spring to the fourth leaf spring.

The first and second asymmetric leaf springs are asymmetric and have a length that is greater on one side than the length on the opposite side. For example, the first leaf spring has a first length between the second connector position and a first end of the leaf spring and a second length between the second connector position and an opposite second end of the leaf spring, wherein the first length is greater than the second length. The asymmetric leaf spring applies substantially uniform compression during use of the fuel cell and provides a longer (flatter) spring rate. The third and fourth leaf springs can also be asymmetric.

Each leaf spring can include a slot having a vertical opening and first and second horizontal openings in a modified Z-shape. As used herein, the terms "vertical" and "horizontal" refer to the relative orientations of the slot openings of a leaf spring as oriented in FIG. 9, in which the vertical opening is parallel to an imaginary axis extending along the first and second lengths of the leaf spring, and the horizontal openings are perpendicular to that imaginary axis. The tension member or members operatively connected to the leaf spring can have a spring bias and legs that are inserted into the vertical opening of the slot and are biased to move into the respective connector positions on the leaf spring on opposite sides of the fuel cell stack to form friction connections. The tension members may include bent wires. The bent wire has a leg at an end that is trapped within the slot via frictional engagement. Each leaf spring can include first and second shoulders that extend beyond a width of the fuel cell stack such that the tension wires extend along a height of the fuel cell stack and are spaced therefrom.

The compression system can include additional springs on either or both of the first and second ends of the fuel cell stack. For example, for wider fuel cell stacks it may be desirable to add one or more springs between the first and second springs on the first end of the fuel cell stack to provide uniform compression. The additional springs may be symmetric or asymmetric. The additional springs can be of any suitable design, including but not limited to leaf springs, and they can be operatively connected to the first end of the stack in the same manner as the first and second leaf springs or in a different manner. Similarly, one or more additional springs can be added to the second end of the fuel cell stack to provide uniform compression.

Figure 1:
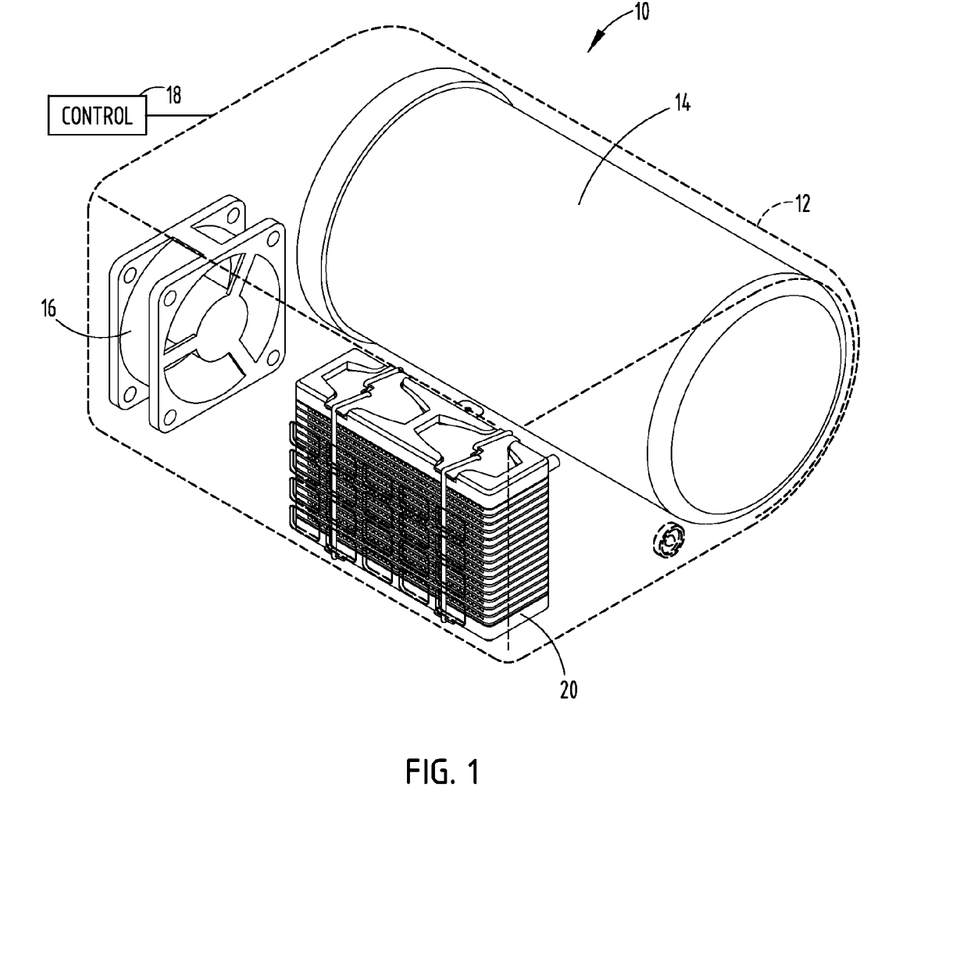
FIG. 1 is a perspective view of a fuel cell system employing a fuel cell stack, according to one embodiment.

Referring to FIG. 1, a fuel cell system 10 is generally shown arranged within a fuel cell system housing 12. The fuel cell system housing 12 may include a fuel cell compartment provided in an electrically powered device, such as a computer. The fuel cell system 10 includes a fuel cell stack 20 having a stack of individual fuel cells. The fuel cell stack 20 has a hydrogen gas input to receive and consume hydrogen gas to generate electricity which, in turn, may be supplied to the electrically powered device. The fuel cell stack 20 generally includes a stack of fuel cells each having positive and negative electrodes as is generally known in the fuel cell art. The hydrogen gas may be used as the negative electrode active material and oxygen may be used as the positive electrode active material.

The fuel cell system 10 also includes a hydrogen supply or generator 14. The hydrogen supply or generator 14 is shown disposed within the housing 12. It should be appreciated that the fuel cell system 10 may employ a cartridge that supplies hydrogen, according to one embodiment. According to other embodiments, the fuel cell system 10 may employ a hydrogen generator that generates hydrogen as needed. The hydrogen gas is then provided along with oxygen to the fuel cell stack 20 which generates electrical power.

The fuel cell system 10 also includes a fan 16 for blowing air including oxygen through the fuel cell stack 20 and cooling the fuel cell stack 20. In addition, a controller 18 is illustrated coupled to or included in the fuel cell system 10. The controller 18 may control the fan and the hydrogen generator 14 and its generation of hydrogen as desired to meet the needs of the fuel cell stack 20 to provide sufficient electrical power. It should be appreciated that the controller 18 may be located within the fuel cell housing 12 or elsewhere within the fuel cell system 10 or the electrical device employing the fuel cell system 10. It should further be appreciated that the controller 18 could be located within the hydrogen generator 14 or fuel cell stack 20, according to other embodiments. The control system can include a microprocessor or micro controller; digital, analog and/or hydride circuitry; solid state and/or electromechanical switching devices; capacitors, sensing instrumentation, and so on.

Referring to FIGS. 2-6, the fuel cell system 10 and its fuel cell stack 20 and compression system 40 for compressing the fuel cell stack 20 is illustrated. The fuel cell system 10 includes a fuel cell stack 20 made up of a plurality of individual fuel cells 24 stacked on one on top of the other. Each fuel cell 24 has a thin generally rectangular housing and generates electrical power by reacting hydrogen gas and oxygen. Typically, the fuel cell housing is made of an electrically conductive material. The electrical power generated by all fuel cells 24 is added together to supply a larger electrical output. A first non-conductive end plate 26 is connected at one end to the top of the stack 20 and a second non-conductive end plate 28 is connected at an opposite end to the bottom end of the stack 20. The end plates 26 and 28 may be made of a thermoset molding compound such as a filled polyphenolic molding compound, which is electrically non-conductive. A positive contact terminal 36 is provided near the top of a stack and a negative contact terminal 38 is provided near the bottom of the stack for providing respective positive and negative polarity electrical connections to output the electrical power generated by the fuel cell system 10.

Figure 2:
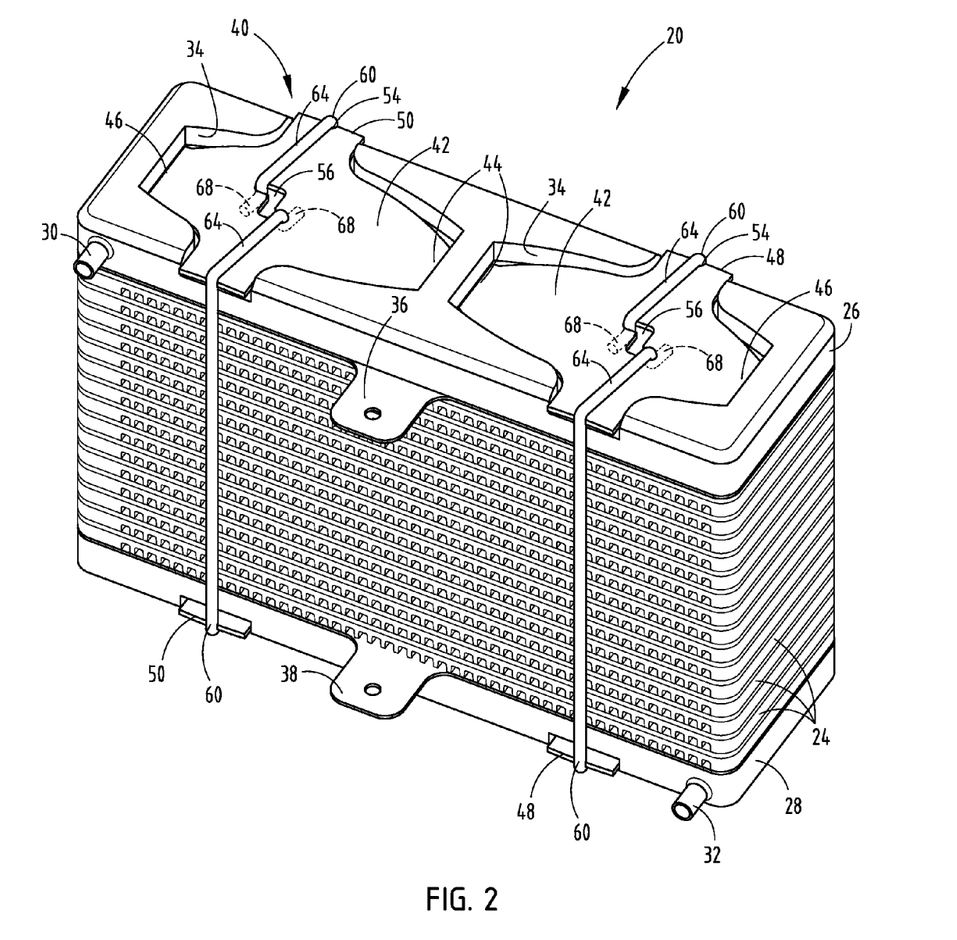
FIG. 2 is a perspective view of the fuel cell stack employing a compression system, according to one embodiment.
Figure 3:
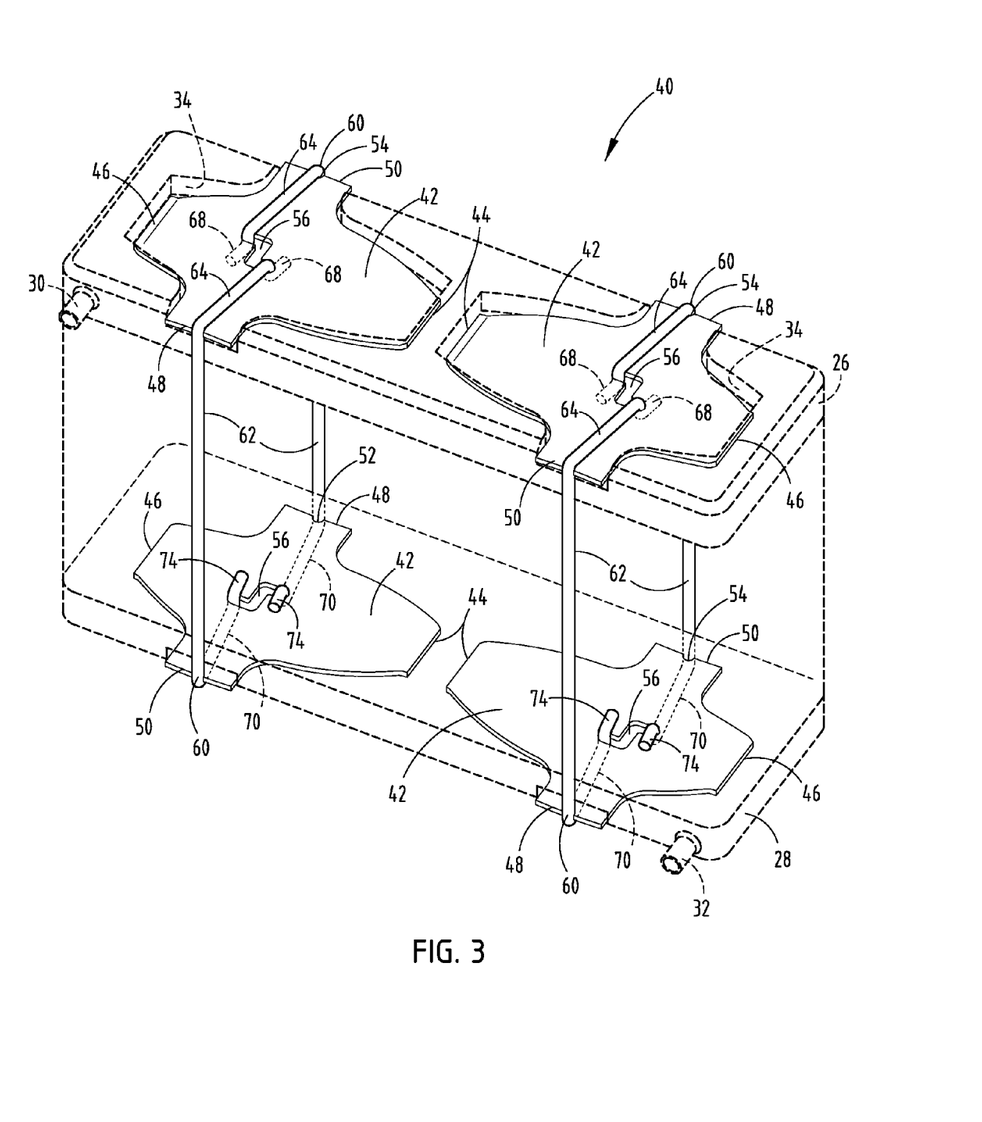
FIG. 3 is a perspective view of the compression system with the fuel cell stack removed.
Figure 4:
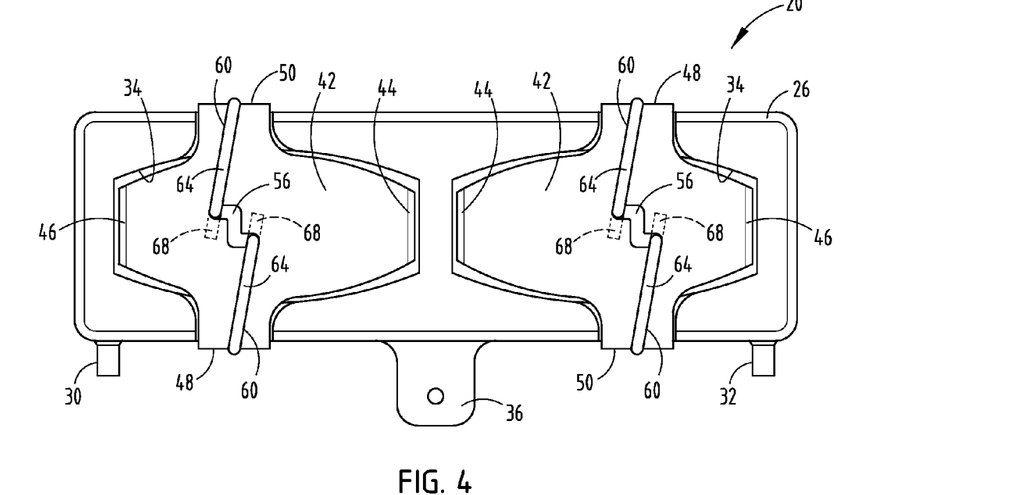
FIG. 4 is a top view of the fuel cell stack shown in FIG. 2.
Figure 5:
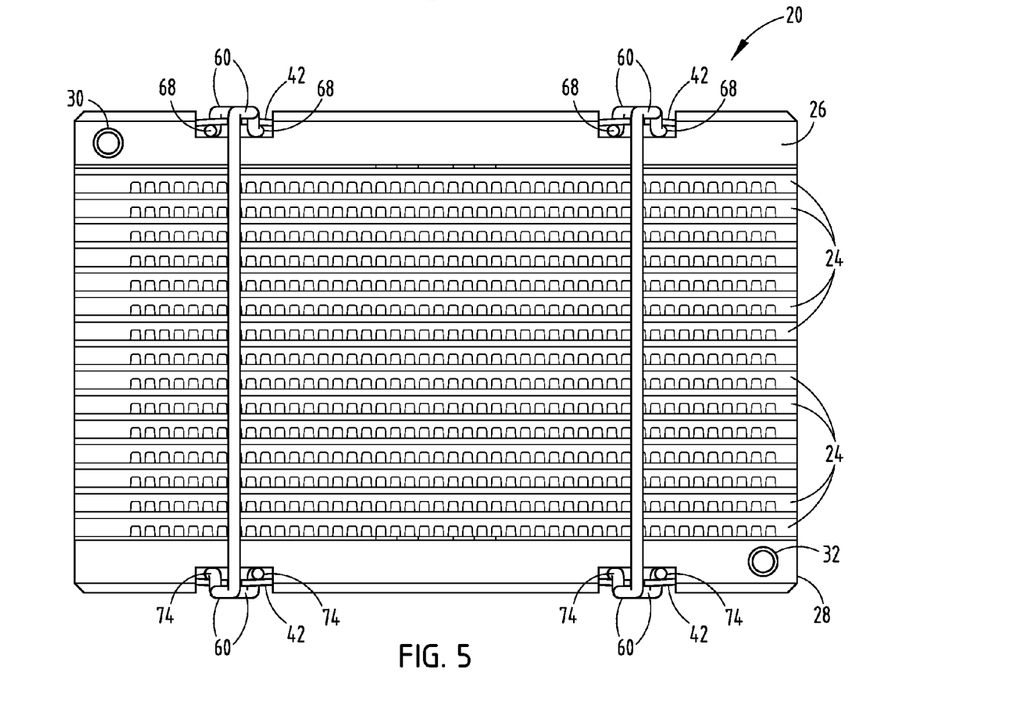
FIG. 5 is a side view of the fuel cell stack shown in FIG. 2.
Figure 6:
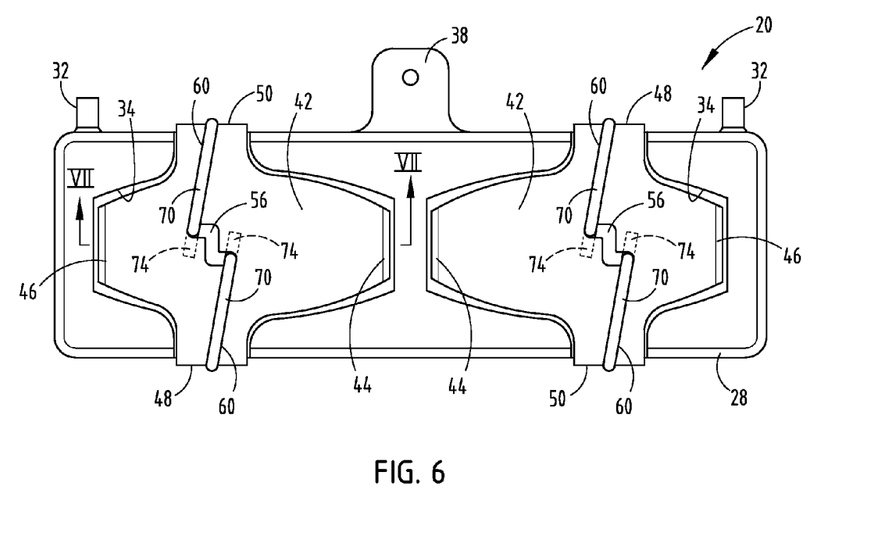
FIG. 6 is a bottom view of the fuel cell stack shown in FIG. 2.
Figure 7:
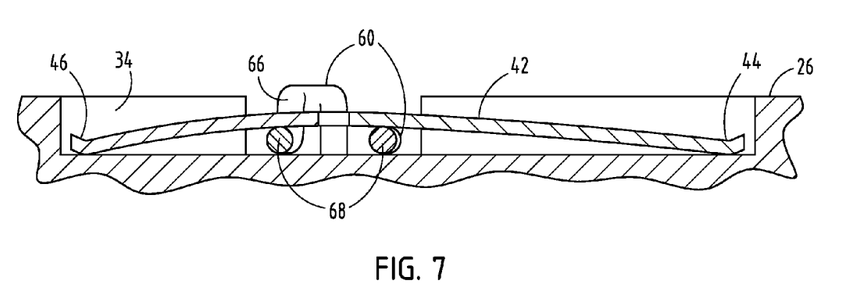
FIG. 7 is a cross-sectional view taken through line VII-VII of FIG. 6 further illustrating the compression system.
Figure 8:
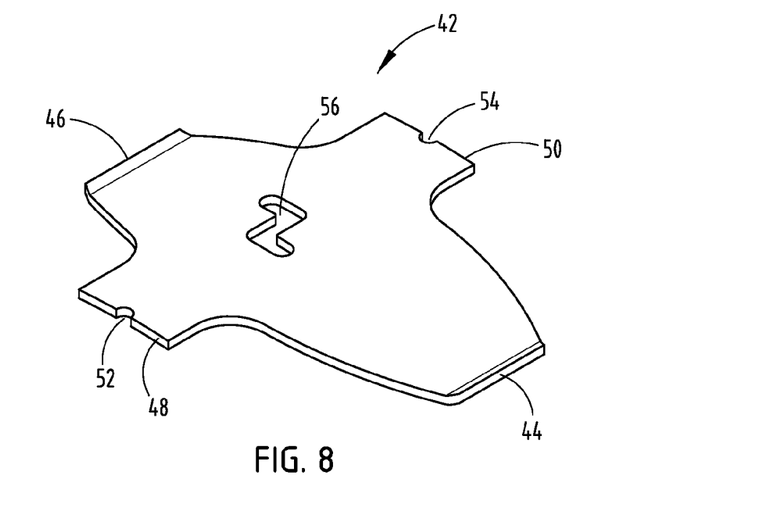
FIG. 8 is a perspective view of an asymmetric leaf spring employed in the compressive system.

The top end plate 26 is shown including a first port 30 and the bottom end plate 28 has a second port 32. One of ports 30 and 32 serves a hydrogen input port and the other of ports 30 and 32 serves as a hydrogen byproduct output port. Hydrogen gas may enter the input port and pass through the stack 20 of hydrogen fuel cells 24 where it reacts with the oxygen that is provided through the radiator-like openings as seen in FIG. 2. The hydrogen is oxidized at the negative electrode to produce hydrogen ions and electrons. The hydrogen ions pass through an electrically non-conductive, ion permeable separator and the electrons pass through an external circuit to the positive electrode, where oxygen is reduced. The fuel cells 24 and stack 20 may be configured in various shapes, sizes and arrangements.

The compression system 40 is shown in FIG. 2 applying a compressive load to the fuel cell stack 20. The compression system 40 is shown having four asymmetric leaf springs 42 arranged within recesses 34 of end plates 26 and 28. The recesses 34 may be cut-outs shaped and seized to receive the leaf spring. While four asymmetric leaf springs 42 are shown and described herein, it should be appreciated that one or more leaf springs may be provided to provide a compressive force to the fuel cell stack 20. The compression system 40 is further shown in FIG. 3 with the fuel cell stack 20 removed. Included on top of the top end plate 26 are first and second asymmetric leaf springs 42. Included on the bottom end of the bottom end plate 28 are third and fourth asymmetric leaf springs 42. The first and third asymmetric leaf springs 42 are vertically aligned and connected together via at least one tension member shown as first and second tension members 60, which are shown and described herein as bent wires. The second and fourth asymmetric leaf springs 42 are likewise vertically aligned and connected together via at least another tension member shown as third and fourth tension members 60, which likewise are shown and described as bent tension wires. The tension members 60 connect to the corresponding asymmetric leaf springs 42 at first and second connector locations and are connected thereto when the leaf springs 42 are compressed so as to provide a tension on the tension members 60 that compresses the leaf springs 42 to provide a compressive load to the fuel cell stack 20.

Figure 9:
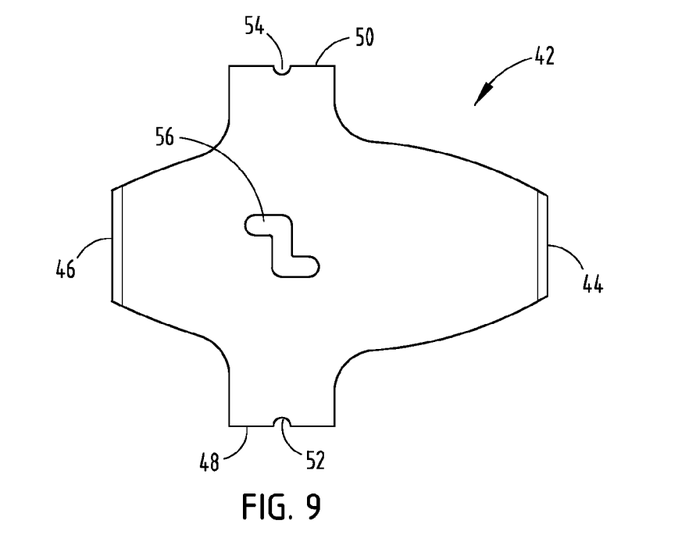
FIG. 9 is a top view of the asymmetric leaf spring shown in FIG. 8.

Each of the asymmetric leaf springs as seen in FIGS. 2-10 has a slot 56 which provides first and second connection positions for connecting to the tension members 60. The slot 56 as seen in FIG. 9 is shown as a modified Z-shape having a vertical opening and first and second horizontal openings at opposite top and bottom ends extending in opposite directions. The slot 56 enables a leg of the tension member 60 to be disposed within the vertical opening and slid over via spring bias to a locked frictional engagement position within one of the horizontal portions. The slot 52 thereby provides first and second connector positions at or near the end of each horizontal opening for connecting to the tension member 60. Each asymmetric leaf spring 42 has a first end 44 and a second end 46 upon which the leaf spring contacts or engages the corresponding end plate and is compressed. The asymmetric leaf spring 42 has a first length between one of the connector positions and the first end 44 and a second length between the other of the second connector positions and the opposite end 46, with the first length being greater than the second length. As such, the leaf spring 42 is longer on one side of slot 56 as compared to the opposite side. As a result, the leaf spring 42 is asymmetric. The longer length sides of the first and second leaf springs are shown adjacent to one another extending toward the center of the end plate 26. Similarly, the longer length side of the third and fourth leaf springs 42 likewise are positioned adjacent to one another extending toward the center of the end plate 28. By providing asymmetric leaf springs 42, the load applied to the leaf springs can be more uniformly distributed across the length of the corresponding end plates.

The compression system 40 advantageously provides a substantially constant compression load on a fuel cell stack 20 that may vary over a range of lengths due to manufacturing tolerances and moisture swell. In some embodiments, a fuel cell stack may include ten to one hundred fuel cells stacked in series one on top of the other and may vary in thickness. By employing asymmetric leaf springs, the load applied to the end plates is more uniform such that a thinner end plate may be employed which may provide a more compact, lighter weight and less expensive assembly. It should be appreciated that the end plates 26 and 28 have a thickness sufficient to prevent excessive flexing. The length of the leaf springs 42 may have a length to provide a desired spring rate, uniform stack end plate loads, and thin end plates in the overall assembly.

The leaf springs 42 may be made of carbon steel or other spring steel. The leaf springs are flexible such that they compress between first and second ends 44 and 46. According to one embodiment, each leaf spring 42 may compress up to one-quarter inch. However, it should be appreciated that the distance of compression of leaf spring 42 may vary depending on the number of fuel cells in the stack, temperature, humidity and other variables. The asymmetric leaf springs 42 provide substantially uniform compression and allow for a longer (flatter) spring rate.

The asymmetric leaf spring 42 includes lateral projecting shoulders 48 and 50 on opposite sides of the fuel cell stack 20. Shoulders 48 and 50 extend beyond a width of the fuel cell stack 20 such that the tension members 60 extend along the height of the fuel cell stack 20 and are spaced therefrom so as to be electrically isolated from the stack 20. Shoulder 48 has a semicircular notch provided therein for receiving the tension member 60. Similarly, shoulder 50 has a semicircular notch 54 provided therein for receiving the other tension member 60. As such, the pair of tension members 60 is engaged within slots 50 and 54 of shoulders 48 and 50, respectively, and the terminal ends thereof are engaged within slot 56. While the notches 52 and 54 are shown as semicircular for receiving round wire, it should be appreciated that other shapes and sizes may be employed.

Figure 11:
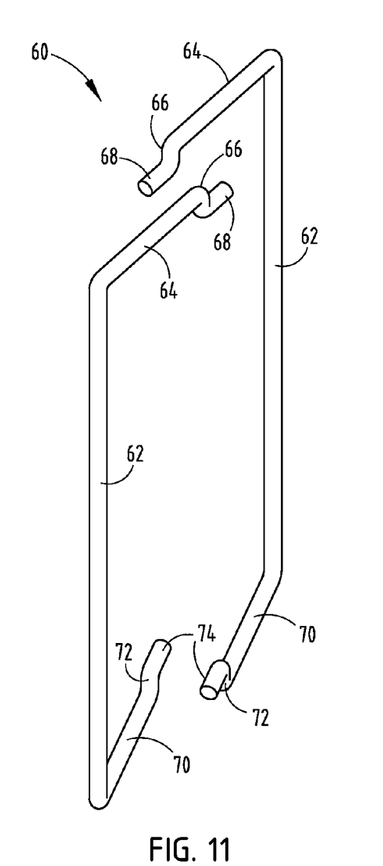
FIG. 11 is a perspective view of a pair of tension members shown as bent wires employed in the compression system.
Figure 12:
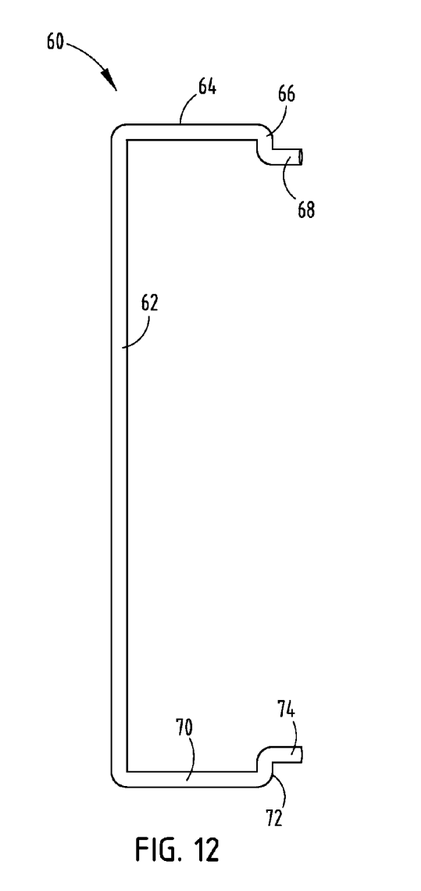
FIG. 12 is a side view of one of the bent wires shown in FIG. 11.
Figure 13:
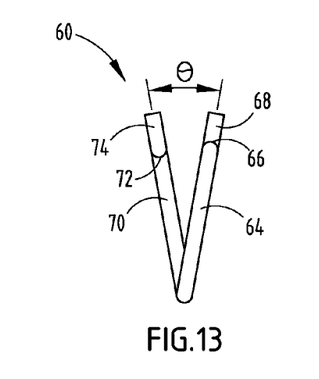
FIG. 13 is a top view of the bent wire shown in FIG. 12.

The tension members 60 are illustrated in FIGS. 11 and 12 shown as bent tension wires. Each tension wire 60 is formed with a torsional twist so as to provide a spring bias that allows a tension member 60 to be inserted within the slots 56 on opposite leaf springs 42 and to move outward into the first and second connector positions on slot 56 of the corresponding leaf springs. The bent tension wire may be made of carbon steel spring wire, such as piano wire. It should be appreciated that other tension members may be employed, according to other embodiments. Each tension member 60 has a vertical portion 62 with bent top and bottom portions that are substantially perpendicular to the vertical portion 62. The top portion includes a first horizontal portion 64 which bends downward at portion 66 and extends outward substantially horizontal at terminal leg portion 68. The bottom portion likewise includes a horizontal portion 70 which bends upward at portion 72 and extends outward at a terminal leg portion 74. Terminal leg portions 68 and 74 are sized and adapted to fit within slots 56 of leaf springs 42 on top and bottom sides of the stack 20 and are biased outward relative to the top and bottom leaf springs 42 so as to slide within the horizontal slot portions of slot 56 into a frictional engagement therewith. The amount of torsional twist in wire 60 is shown in FIG. 13 as the angle θ. The tension member 60 may be twisted and compressed between the bottom and top leg portions 68 and 74 so as to make θ smaller (e.g., near 0°) such that the leg portions 68 and 74 are engageable within the vertical opening slot 56 aligned on top and bottom leaf springs 42 and thereafter released to spread apart into position with the first and second connector portions of slots 56.

Figure 10:
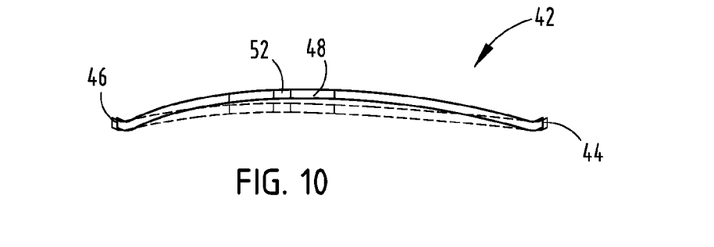
FIG. 10 is a side view of the leaf spring shown uncompressed in solid lines and compressed in phantom.

To assemble the compression system 40 onto a fuel cell stack 20, the fuel cell stack 20, end plates 26 and 28 and leaf springs 42 may be assembled into a press that is used to compress leaf springs 42. Compression of the leaf spring 42 is illustrated in FIG. 10 between a first non-compressed position shown in solid lines and a second compressed position as shown in phantom. With the leaf springs 42 compressed, the tension members 60 may be assembled by inserting leg portions 68 and 74 within the vertical openings of slots 56 of leaf springs 42 at opposite ends of the compression system 40 and allowing the leg portions 68 and 74 to spring bias and move outward to the first or second connector positions. The forward spring bias of the tension member 60 will push the leg portions in opposite directions such that they are seated in the slots 56. Upon assembly of the bent tension members 60, the fuel cell stack 20 and assembled compression system 40 may be removed from the press whereby compressed load is applied to the tension members and leaf springs 42 provides enhanced frictional engagement between the terminal leg portions 68 and 74 and the leaf spring 42.

The compression system 40 advantageously provides for a substantially uniform compression of the fuel cell stack 20 during use of the fuel cell stack. The compression system 40 is essentially made up of two different manufactured components, namely, an asymmetric leaf spring 42 and a bent tension member 60. In the embodiment shown, four asymmetric leaf springs 42 and four tension members 60 are employed to form the compression system 40. However, it should be appreciated that one or more leaf springs and one or more tension members may be employed according to other embodiments.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the Doctrine of Equivalents.

The invention claimed is:

1. A compression system for providing compressive force to a fuel cell stack having first and second ends, said compression system comprising:
   a first asymmetric leaf spring operatively connected to the first end of the fuel cell stack, the first leaf spring comprising:
      a first slot comprising a vertical opening and first and second horizontal openings with first and second connector positions at or near the ends of the horizontal openings; and
      first and second notches on opposing sides of the first asymmetric leaf spring in alignment with the vertical opening;
   a second asymmetric leaf spring operatively connected to the first end of the fuel cell stack, the second leaf spring comprising:
      a second slot comprising a vertical opening and first and second horizontal openings with first and second connector positions at or near the ends of the horizontal openings; and
      first and second notches on opposing sides of the second asymmetric leaf spring in alignment with the vertical opening;
   first and second tension members operatively connected to the first leaf spring and supported at the second end of the fuel cell stack; and
   third and fourth tension members operatively connected to the second leaf spring and supported at the second end of the fuel cell stack;

wherein each tension member comprises a vertical portion and bent top and bottom portions that are substantially perpendicular to the vertical portion, wherein:
the top portion comprises a first horizontal portion which bends downward toward the midpoint of the vertical portion and then bends to a terminal portion that extends substantially horizontal in the same direction as the first horizontal portion;
the terminal portion is sized and adapted to fit within the first and second slots of the first and second asymmetric leaf springs; and
the tension member has a torsional spring bias through the vertical portion such that the top and bottom portions are biased opposite each other angularly apart;
wherein the first tension member is placed in the first notch and connected at the first connector position of the first leaf spring, the second tension member is placed in the second notch and connected at the second connector position of the first leaf spring, the third tension member is is placed in the first notch and connected at the first connector position of the second leaf spring, and the fourth tension member is placed in the second notch and connected at the second connector position of the second leaf spring;
wherein each of first and second tension members have the bottom portion fixedly supported at the second end of the fuel cell stack and are operatively connected to the first leaf spring such that for each of the first and second tension members:
the vertical portion is engaged with one of the first and second notches of the first leaf spring; and
the torsional spring bias forces the terminal portion of the tension member in opposite directions into engagement within one of the first and second connector positions,
wherein the third and fourth tension members have the bottom portion fixedly supported at the second end of the fuel cell stack and are operatively connected to the second leaf spring such that for each of the third and fourth tension members:
the vertical portion is engaged with one of the first and second notches of the second leaf spring; and
the torsional spring bias forces the terminal portion of the tension member in opposite directions into engagement within one of the first and second connector positions;
wherein the first and second tension members compress the first leaf spring and the third and fourth tension members compress the second leaf spring to provide a compressive load to the fuel cell stack.

2. The compression system of claim 1, further comprising:
a third asymmetric leaf spring operatively connected to the second end of the fuel cell stack and comprising:
a third slot comprising a vertical opening and first and second horizontal openings with first and second connector positions at or near the ends of the horizontal openings; and
first and second notches on opposing sides of the third asymmetric leaf spring in alignment with the vertical opening;
a fourth asymmetric leaf spring operatively connected to the second end of the fuel cell stack and comprising
a fourth slot comprising a vertical opening and first and second horizontal openings with first and second connector positions at or near the ends of the horizontal openings; and
first and second notches on opposing sides of the fourth asymmetric leaf spring in alignment with the vertical opening;
wherein the bottom portion of each tension member further comprises a first horizontal portion which bends upward toward the midpoint of the vertical portion and then bends to a terminal portion that extends substantially horizontal in the same direction as the first horizontal portion, wherein the terminal portion is sized and adapted to fit within the first and second slots of the third and fourth asymmetric leaf springs; and
wherein the first and second tension members connect the first leaf spring to the third leaf spring, with the first tension member placed in the first notch and connected at the first connector position of the third leaf spring, the second tension member placed in the second notch and connected at the second connector position of the third leaf spring, wherein the torsional spring biases of the first and second tension members force the terminal portions of the bottom portions of the first and second tension members into engagement with the first and second connector positions of the third leaf spring, and
wherein the third and fourth tension members connect the second leaf spring to the fourth leaf spring, with the third tension member placed in the first notch and connected at the first connector position of the fourth leaf spring, the fourth tension member placed in the second notch and connected at the second connector position of the fourth leaf spring, wherein the torsional spring biases of the third and fourth tension members force the terminal portions of the bottom portions of the third and fourth tension members into engagement with the first and second connector positions of the third leaf spring; and
wherein the first and second tension members compress the first and third leaf springs and the third and fourth tension members compress the second and fourth leaf springs to provide a compressive load to the fuel cell stack.

3. The compression system of claim 2, wherein the torsional spring bias of each tension member causes the terminal portions of the top and bottom portions to form a friction connection within the first and second connector positions of the leaf springs.

4. The fuel cell system of claim 2,
wherein each of the asymmetric leaf springs has a first end and an opposite second end upon which the respective leaf spring is configured to engage the corresponding end of the fuel cell stack and be compressed, and
wherein each of the asymmetric leaf springs has a first length between the first connector position and the first end of the leaf spring and a second length between the second connector position and the opposite second end of the leaf spring, wherein the first length is greater than the second length.

5. The compression system of claim 1, wherein each of the first and second asymmetric leaf springs has a first length between the second connector position and a first end of the leaf spring and a second length between the second connector position and an opposite second end of the leaf spring, wherein the first length is greater than the second length.

6. The compression system of claim 1, wherein each of the at least one and the at least another tension members comprises a bent wire.

7. The compression system of claim 1, wherein each of the first and second leaf springs comprises first and second shoulders that extend beyond a width of the fuel cell stack such that the at least one and at least another tension members extend along a height of the fuel cell stack and are spaced therefrom, with the first and second notches disposed within the first and second shoulders of each leaf spring.

8. The compression system of claim 1, wherein the first and second leaf springs are in contact with a non-conductive end plate.

9. A fuel cell system comprising:
a fuel cell stack having first and second ends,
a compression system for providing compressive force to the fuel cell stack, the compression system comprising:
a first asymmetric leaf spring operatively connected to the first end of the fuel cell stack, the first leaf spring comprising:
   a first slot comprising a vertical opening and first and second horizontal openings with first and second connector positions at or near the ends of the horizontal openings; and
   first and second notches on opposing sides of the first asymmetric leaf spring in alignment with the vertical opening;
a second asymmetric leaf spring operatively connected to the first end of the fuel cell stack, the second leaf spring comprising:
   a second slot comprising a vertical opening and first and second horizontal openings with first and second connector positions at or near the ends of the horizontal openings; and
   first and second notches on opposing sides of the second asymmetric leaf spring in alignment with the vertical opening;
first and second tension members operatively connected to the first leaf spring and supported at the second end of the fuel cell stack; and
third and fourth tension members operatively connected to the second leaf spring and supported at the second end of the fuel cell stack;
wherein each tension member comprises a vertical portion and bent top and bottom portions that are substantially perpendicular to the vertical portion, wherein:
   the top portion comprises a first horizontal portion which bends downward toward the midpoint of the vertical portion and then bends to a terminal portion that extends substantially horizontal in the same direction as the first horizontal portion;
   the terminal portion is sized and adapted to fit within the first and second slots of the first and second asymmetric leaf springs; and
   the tension member has a torsional spring bias through the vertical portion such that the top and bottom portions are biased opposite each other angularly apart;
wherein the first tension member is placed in the first notch and connected at the first connector position of the first leaf spring, the second tension member is placed in the second notch and connected at the second connector position of the first leaf spring, the third tension member is placed in the first notch and connected at the first connector position of the second leaf spring, and the fourth tension member is placed in the second notch and connected at the second connector position of the second leaf spring;
wherein each of first and second tension members have the bottom portion fixedly supported at the second end of the fuel cell stack and are operatively connected to the first leaf spring such that for each of the first and second tension members:
   the vertical portion is engaged with one of the first and second notches of the first leaf spring; and
   the torsional spring bias forces the terminal portion of the tension member in opposite directions into engagement within one of the first and second connector positions,
wherein the third and fourth tension members have the bottom portion fixedly supported at the second end of the fuel cell stack and are operatively connected to the second leaf spring such that for each of the third and fourth tension members:
   the vertical portion is engaged with one of the first and second notches of the second leaf spring; and
   the torsional spring bias forces the terminal portion of the tension member in opposite directions into engagement within one of the first and second connector positions;
wherein the first and second tension members compress the first leaf spring and the third and fourth tension members compress the second leaf spring to provide a compressive load to the fuel cell stack.

10. The fuel cell system of claim 9, wherein the compression system further comprises:
a third asymmetric leaf spring operatively connected to the second end of the fuel cell stack and comprising:
   a third slot comprising a vertical opening and first and second horizontal openings with first and second connector positions at or near the ends of the horizontal openings; and
   first and second notches on opposing sides of the third asymmetric leaf spring in alignment with the vertical opening;
a fourth asymmetric leaf spring operatively connected to the second end of the fuel cell stack and comprising
   a fourth slot comprising a vertical opening and first and second horizontal openings with first and second connector positions at or near the ends of the horizontal openings; and
   first and second notches on opposing sides of the fourth asymmetric leaf spring in alignment with the vertical opening;
wherein the bottom portion of each tension member further comprises a first horizontal portion which bends upward toward the midpoint of the vertical portion and then bends to a terminal portion that extends substantially horizontal in the same direction as the first horizontal portion, wherein the terminal portion is sized and adapted to fit within the first and second slots of the third and fourth asymmetric leaf springs; and
wherein the first and second tension members connect the first leaf spring to the third leaf spring, with the first tension member placed in the first notch and connected at the first connector position of the third leaf spring, the second tension member placed in the second notch and connected at the second connector position of the third leaf spring, wherein the torsional spring biases of the first and second tension members force the terminal portions of the bottom portions of the first and second tension members into engagement with the first and second connector positions of the third leaf spring, and
wherein the third and fourth tension members connect the second leaf spring to the fourth leaf spring, with the third tension member placed in the first notch and connected at the first connector position of the fourth leaf spring, the fourth tension member placed in the second notch and connected at the second connector position of the fourth leaf spring, wherein the torsional spring biases of the third and fourth tension members force the terminal portions of the bottom portions of the third and fourth tension members into engagement with the first and second connector positions of the third leaf spring; and wherein the first and second tension members compress the first and third leaf springs and the third and fourth tension members compress the second and fourth leaf springs to provide a compressive load to the fuel cell stack.

11. The fuel cell system of claim 10, wherein the torsional spring bias of each tension member causes the terminal portions of the top and bottom portions to form a friction connection within the first and second connector positions of the leaf springs.

12. The fuel cell system of claim 9, wherein each of the first and second asymmetric leaf springs has a first length between the second connector position and a first end of the leaf spring and a second length between the second connector position and an opposite second end of the leaf spring, wherein the first length is greater than the second length.

13. The fuel cell system of claim 9, further comprising first and second nonconductive end plates forming the first and second ends, wherein the compression system contacts the first and second non-conductive end plates.

14. A compression system for providing compressive force to a fuel cell stack having first and second ends, said compression system comprising:
a first leaf spring operatively connected to the first end of the fuel cell stack, the first leaf spring comprising:
a first slot comprising a vertical opening and first and second horizontal openings with first and second connector positions at or near the ends of the horizontal openings; and
first and second notches on opposing sides of the first leaf spring in alignment with the vertical opening;
a first tension member connected at the first connector position of the first leaf spring and supported at the second end of the fuel cell stack; and
a second tension member connected at the second connector position of the first leaf spring and supported at the second end of the fuel cell stack,
wherein the first and second tension members comprise a vertical portion and bent top and bottom portions that are substantially perpendicular to the vertical portion, wherein:
the top portion comprises a first horizontal portion which bends downward toward the midpoint of the vertical portion and then bends to a terminal portion that extends substantially horizontal in the same direction as the first horizontal portion;
the terminal portion is sized and adapted to fit within the first and second slots of the first leaf spring; and
each tension member has a torsional spring bias through the vertical portion such that the top and bottom portions are biased opposite each other angularly apart;
wherein the first tension member is placed in the first notch and connected at the first connector position of the first leaf spring, the second tension member is placed in the second notch and connected at the second connector position of the first leaf spring,
wherein each of first and second tension members have the bottom portion fixedly supported at the second end of the fuel cell stack and are operatively connected to the first leaf spring such that for each of the first and second tension members:
the vertical portion is engaged with one of the first and second notches of the first leaf spring; and
the torsional spring bias forces the terminal portion of the tension member in opposite directions into engagement within one of the first and second connector positions,
wherein the first and second tension members compress the first leaf spring to provide a compressive load to the fuel cell stack.

15. The compression system of claim 14, further comprising a second leaf spring operatively connected to the second end of the fuel cell stack, the second leaf spring comprising:
a second slot comprising a vertical opening and first and second horizontal openings with first and second connector positions at or near the ends of the horizontal openings; and
first and second notches on opposing sides of the second leaf spring in alignment with the vertical opening;
wherein the bottom portion of each tension member further comprises a first horizontal portion which bends upward toward the midpoint of the vertical portion and then bends to a terminal portion that extends substantially horizontal in the same direction as the first horizontal portion, wherein the terminal portion is sized and adapted to fit within the first and second slots of the second leaf spring; and
wherein the first tension member is placed in the first notch of the second leaf spring and connected at the first connector position of the second leaf spring;
wherein the second tension member is placed in the second notch of the second leaf spring and connected at the second connector position of the second leaf spring;
wherein the torsional spring biases of the first and second tension members force the terminal portions of the bottom portions of the first and second tension members into engagement with the first and second connector positions of the second leaf spring; and
wherein the first and second tension members compress the first and second leaf springs to provide a compressive load to the fuel cell stack.

16. The compression system of claim 15, wherein
wherein each of the first and second leaf springs has a first end and an opposite second end upon which the respective leaf spring is configured to engage the corresponding end of the fuel cell stack and be compressed, and
wherein each of the first and second leaf springs has a first length between the first connector position and the first end of the leaf spring and a second length between the second connector position and the opposite second end of the leaf spring, wherein the first length is greater than the second length.

* * * * *